US006401118B1

(12) United States Patent
Thomas

(10) Patent No.: US 6,401,118 B1
(45) Date of Patent: Jun. 4, 2002

(54) METHOD AND COMPUTER PROGRAM PRODUCT FOR AN ONLINE MONITORING SEARCH ENGINE

(75) Inventor: Jason B. Thomas, Arlington, VA (US)

(73) Assignee: Online Monitoring Services, Alexandria, VA (US)

( * ) Notice: Subject to any disclaimer, the term of this patent is extended or adjusted under 35 U.S.C. 154(b) by 0 days.

(21) Appl. No.: 09/133,374

(22) Filed: Aug. 13, 1998

Related U.S. Application Data
(60) Provisional application No. 60/091,164, filed on Jun. 30, 1998.

(51) Int. Cl.[7] .............................. G06F 11/30; G06F 17/00
(52) U.S. Cl. ......................... 709/224; 709/203; 709/217; 709/219; 709/226; 707/5; 707/4
(58) Field of Search ................................ 709/223, 222, 709/225, 226, 203, 217, 219; 707/5, 4, 3, 2, 1

(56) References Cited

U.S. PATENT DOCUMENTS

| | | | | |
|---|---|---|---|---|
| 5,659,732 A | * | 8/1997 | Kirsch ............................ | 707/5 |
| 5,845,278 A | * | 12/1998 | Kirsch et al. ................... | 707/3 |
| 5,864,845 A | * | 1/1999 | Voorhees et al. .............. | 707/5 |
| 5,864,846 A | * | 1/1999 | Voorhees et al. .............. | 707/5 |
| 5,873,107 A | * | 2/1999 | Borovoy et al. ............ | 707/501 |
| 5,913,208 A | * | 6/1999 | Brown et al. ................... | 707/3 |
| 5,913,215 A | * | 6/1999 | Rubinstein et al. ............ | 707/10 |
| 5,920,859 A | * | 7/1999 | Li ................................. | 707/5 |
| 5,924,090 A | * | 7/1999 | Krellenstein .................... | 707/5 |
| 5,933,822 A | * | 8/1999 | Braden-Harder et al. ....... | 707/5 |
| 5,983,216 A | * | 11/1999 | Kirsch et al. ................... | 707/2 |
| 5,987,446 A | * | 11/1999 | Corey et al. .................... | 707/3 |
| 5,991,751 A | * | 11/1999 | Rivette et al. .................. | 707/1 |
| 5,995,961 A | * | 11/1999 | Levy et al. ..................... | 707/4 |
| 6,006,217 A | * | 12/1999 | Lumsden ........................ | 707/2 |
| 6,009,422 A | * | 12/1999 | Ciccarelli ....................... | 707/4 |
| 6,009,459 A | * | 12/1999 | Belfiore et al. ............. | 709/203 |
| 6,018,733 A | * | 1/2000 | Kirsch et al. ................... | 707/3 |
| 6,092,182 A | * | 2/2000 | Nehab et al. ................ | 707/523 |
| 6,041,326 A | * | 3/2000 | Amro et al. ................... | 707/10 |
| 6,078,914 A | * | 6/2000 | Redfern .......................... | 707/3 |
| 6,078,917 A | * | 6/2000 | Paulsen, Jr. et al. ............ | 707/6 |
| 6,094,649 A | * | 7/2000 | Bowen et al. ................... | 707/3 |
| 6,098,065 A | * | 8/2000 | Skillen et al. .................. | 707/3 |
| 6,102,969 A | * | 8/2000 | Christianson et al. .......... | 717/8 |
| 6,112,202 A | * | 8/2000 | Kleinberg ....................... | 707/5 |

* cited by examiner

*Primary Examiner*—Glenton B. Burgess
*Assistant Examiner*—Abdullah E. Salad
(74) *Attorney, Agent, or Firm*—Piper Marbury Rudnick & Wolfe, LLP; Steven B. Kelber

(57) ABSTRACT

An online monitoring search engine. The invention is a system, method and computer program product that allows an organization, company, or the like to monitor the Internet (or any computer network) for violations of their intellectual property (e.g., patent, trademark or copyright infringement), or monitor how persons on the Internet view their business, products and/or services. The system includes a Web server for receiving search requests and criteria from users on a Web client and a server for searching the Internet for URL's that contain contents matching the search criteria, thereby compiling a list of offending URL's. The system also includes a file system for storing contents from each of the offending URL's and a relational database for allowing the server to perform queries of the content in order to produce a report. The method involves receiving search criteria from a user, searching the Internet, downloading offending contents, and then archiving and scoring the contents. The method also obtains contact information for each registrant of the offending URL's and produces a report for the user.

18 Claims, 12 Drawing Sheets

| URL | TITLE OF PAGE | DESCRIPTION | EMAIL | ADDRESS |
|-----|---------------|-------------|-------|---------|
| | | | | |
| | | | | |
| | | ... | | |
| | | | | |
| | | | | |

| ACTIVITY | ORIGIN | STORE-FRONT | PAYMENT METHOD CC  COD  CASH  E-CASH  CHECK | | |
|---|---|---|---|---|---|
| 804 | 806 | 808 | 810 | | |
| SELL | COMMERCIAL | PHYSICAL | ☐ ☐ ☐ ☐ | | |
| SELL | COMMERCIAL | PHYSICAL | ☐ ☒ ☒ ☐ | | |
| SELL | COMMERCIAL | VIRTUAL | ☐ ☐ ☐ ☐ | ••• | |
| | | | | | |
| | | | | | |

FIG. 8 CONT.

| | 812 REVENUE SOURCES<br>ADVERTISING · CONTESTS · MDSE · NONE<br>OTHER MDSE · SUBSCRIPTION · OTHER | 814 PAGE PURPOSE | 816 CLIENT CONTENT<br>AUDIO · VIDEO · GRAPHICS · NONE<br>TEXT · LOGO · LINKS |
|---|---|---|---|
| 802a | □ □ ⊠ □<br>□ □ □ | FAN OR PERSONAL | □ ⊠ □ □<br>⊠ □ □ |
| 802b | □ □ ⊠ □<br>□ □ □ | FAN | □ ⊠ ⊠ □<br>⊠ □ □ |
| 802c | □ □ □ □<br>⊠ □ □ | NEWS OR INFO | □ □ □ □<br>⊠ □ ⊠ |
| 802n | | | |

FROM FIG. 8

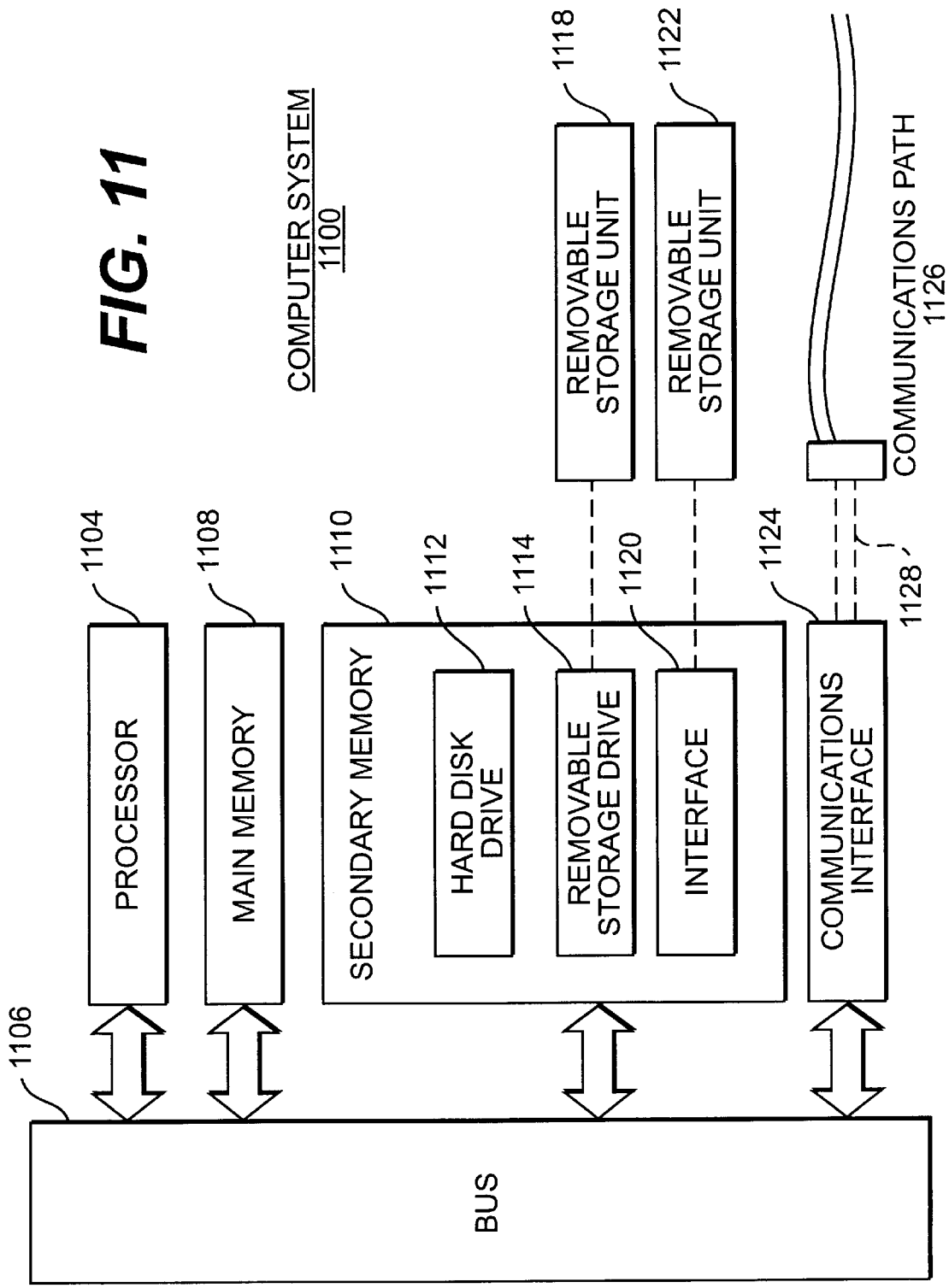

METHOD AND COMPUTER PROGRAM PRODUCT FOR AN ONLINE MONITORING SEARCH ENGINE

CROSS-REFERENCE TO RELATED APPLICATION

This application claims priority to U.S. Provisional Patent Application No. 60/091,164, filed Jun. 30, 1998, which is incorporated herein by reference in its entirety.

BACKGROUND OF THE INVENTION

1. Field of the Invention

The present invention relates generally to computer network search engines, and more particularly to search engines for performing online monitoring activities.

2. Related Art

Over the past several years, there has been an explosion of computers, and thus people, connected to the global Internet and the World-Wide Web (WWW). This increase of connectivity has allowed computer users to access various types of information, disseminate information, and be exposed to electronic commerce activities, all with a great degree of freedom. Electronic commerce includes large corporations, small businesses, individual entrepreneurs, organizations, and the like who offer their information, products, and/or services to people all over the world via the Internet.

The rise in the usage of the Internet, however, has also had a negative side. Given the Internet's vastness and freedom, many unscrupulous individuals have taken the opportunity to profit by violating the intellectual property of others. For example, it has been estimated that billions of dollars in profits are lost each year due to piracy of copyrighted materials over the Internet. These lost profits result from unscrupulous individuals making available through the Internet, either free or for their own profit, copyrighted materials such as music, movies, magazines, software, and pictures. Also, an individual, a company, an organization, or the like may be concerned with other intellectual property violations such as the illegal sale of their products, or the sale of inferior products using their brand names—that is, patent and trademark infringements. Furthermore, an individual, a company, an organization, or the like may be concerned with false information (i.e., "rumors") that originate and spread quickly over the Internet, resulting in the disparagement of the individual, company, organization, or the like. Such entities may also be interested in gathering data about how they and their products and/or services are perceived on the Internet (i.e., a form of market research).

Individual artists, writers, and other owners of intellectual property are currently forced to search Internet Web sites, File Transfer Protocol (FTP) sites, chat rooms, etc. by visiting over thousands of sites in order to detect piracy or disparagement at offending sites. Such searching is currently done either by hand or using commercial search engines. Each of these methods is costly because a great amount of time is required to do such searching—time that detracts from positive, profit-earning activities. Adding to the frustration of detecting infringements is the fact that commercial search engines are infrequently updated and typically limit the resulting number of sites ("hits") that a search request returns. Furthermore, the task of visiting each site to determine whether there is indeed an infringement or disparagement and if so, the extent and character of it, also demands a great deal of time.

Therefore, in view of the above, what is needed is a system, method and computer program product for an online (i.e., Internet or intranet) monitoring search engine. Such online monitoring would enhance the ability of intellectual property owners and business owners to detect and prioritize their response to infringements and disparagements. Further, what is needed is a system, method and computer program product that searches the Internet's Web pages, FTP sites, FSP sites, Usenet newsgroups, chat rooms, etc. for data relevant to the intellectual property and goodwill owned by an entity and produces a detailed, customized report of offending sites.

SUMMARY OF THE INVENTION

The present invention is a system, method and computer program product for an online monitoring search engine that satisfies the above-stated needs. The method involves receiving search criteria from a user, where the search criteria reflects the user's intellectual property infringement or disparagement concerns. Then a search of the Internet (or intranet) is done for uniform resource locators (URL's) (i.e., addresses) that specify sites which contain contents matching the search criteria. After a list of URL's containing probable infringements or disparagement is obtained, the pages of each URL are downloaded, archived, and scored. The method also obtains contact information for each registrant of the offending URL'S. The method then produces a report listing the offending URL's and the score for each of the URL's. The report may then be utilized by the user to plan intellectual property infringement or disparagement enforcement activities. In a preferred embodiment of the present invention, before generating a report, the pages are also grouped into "actual sites" to reduce the magnitude of information contained in the report. The method may also list the highest scoring page for each of the actual sites, as well as the highest ranking actual site.

The online monitoring system of the present invention includes a Web server for receiving search criteria, search setup, and management inputs from users, an intellectual property infringement server (IPIS) for searching the Internet (or any computer network) for URL's that contain contents matching the search criteria to thereby compile a list of offending URL's. The system also includes a file system for storing pages from each of the offending URL's and a relational database for allowing the IPIS to perform queries of the pages in order to produce a report. In a preferred embodiment, the system also includes a plurality of Web clients that provide a graphical user interface (GUI) for users to enter their search criteria, as well as view pages of the offending URL's by communicating with the Web server.

One advantage of the present invention is that intellectual property owners may quickly and efficiently search and find infringements and disparagements contained on Web, FTP, and FSP sites, as well as chat rooms and Usenet newsgroups within the Internet.

Another advantage of the present invention is that detailed and customizable reports listing offending sites and associated metrics are produced allowing intellectual property owners to focus their enforcement activities.

Another advantage of the present invention is that its back-end (search engine) and front-end (user interface) are designed to operate independently of each other, thus allowing greater throughput and availability of the system as a whole.

Yet another advantage of the present invention is that lists of probable offending URL's may be grouped and prioritized, both in an automated and manual fashion, in order to arrive at a manageable set of data to focus intellectual property enforcement activities.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 6–10 are exemplary output report pages according to an embodiment of the present invention; and FIG. 11 is a block diagram of an exemplary computer system useful for implementing the present invention.

DETAILED DESCRIPTION OF THE PREFERRED EMBODIMENTS

Table of Contents
I. Overview
II. System Architecture
III. Software Architecture
IV. Overall Monitoring System Operation
   A. Inputs and Searching
   B. Web Crawling
   C. FTP Crawling
   D. Processing
   E. Output
   F. Downloading Non-FTP and Non-HTTP Contents
V. Graphical User Interface (Front-End)
VI. Search Engine (Back-End)
   A. Multi-Threaded Execution Environment
   B. Meta Search Engine Mode
   C. Standard Search Engine Mode
VII. Output Reports
VIII. Front-End and Back-End Severability
IX. Environment
X. Conclusion
I. Overview The present invention is directed to a system, method, and computer program product for an online monitoring search engine. In a preferred embodiment of the present invention, an organization provides monitoring services for clients that would include, for example, individuals, companies, consortiums, organizations, and the like who are interested in protecting their intellectual property and/or goodwill from infringement or disparagement on the Internet.

Such a monitoring organization would employ an intelligent search engine that spans the entire Internet (Web pages, FTP sites, FSP sites, chat rooms, Usenet newsgroups, etc.) and returns links to Internet sites that, with a high probability of certainty, contain infringing or disparaging content. The input of the monitoring organization's search engine would be customized for each client based on, for example, their products, services, business activity, and/or the form of intellectual property owned. The monitoring organization's search engine would also provide detailed reports, also customized to fit each client's monitoring needs, so that the client's legal personnel may prioritize their enforcement activities. In a preferred embodiment, the monitoring organization also provides a Web server so that clients may remotely utilize the search engine.

While the present invention is described in terms of the above example, this is for convenience only and is not intended to limit its application. In fact, after reading the following description, it will be apparent to one skilled in the relevant art(s) how to implement the following invention in alternative embodiments (e.g., providing online monitoring for a corporate intranet or extranet).

Furthermore, while the following description focuses on the monitoring of Web sites and FTP sites, and thus employs such terms as URL's (addresses) and Web pages (contents), it is not intended to limit the application of the present invention. It will be apparent to one skilled in the relevant art how to implement the following invention, where appropriate, in alternative embodiments. For example, the present invention may be applied to monitoring Internet addresses (URL's, URN's, and the like) that specify the contents of chat rooms, or Usenet newsgroups, FSP sites, etc.

II. System Architecture

Figure 1:
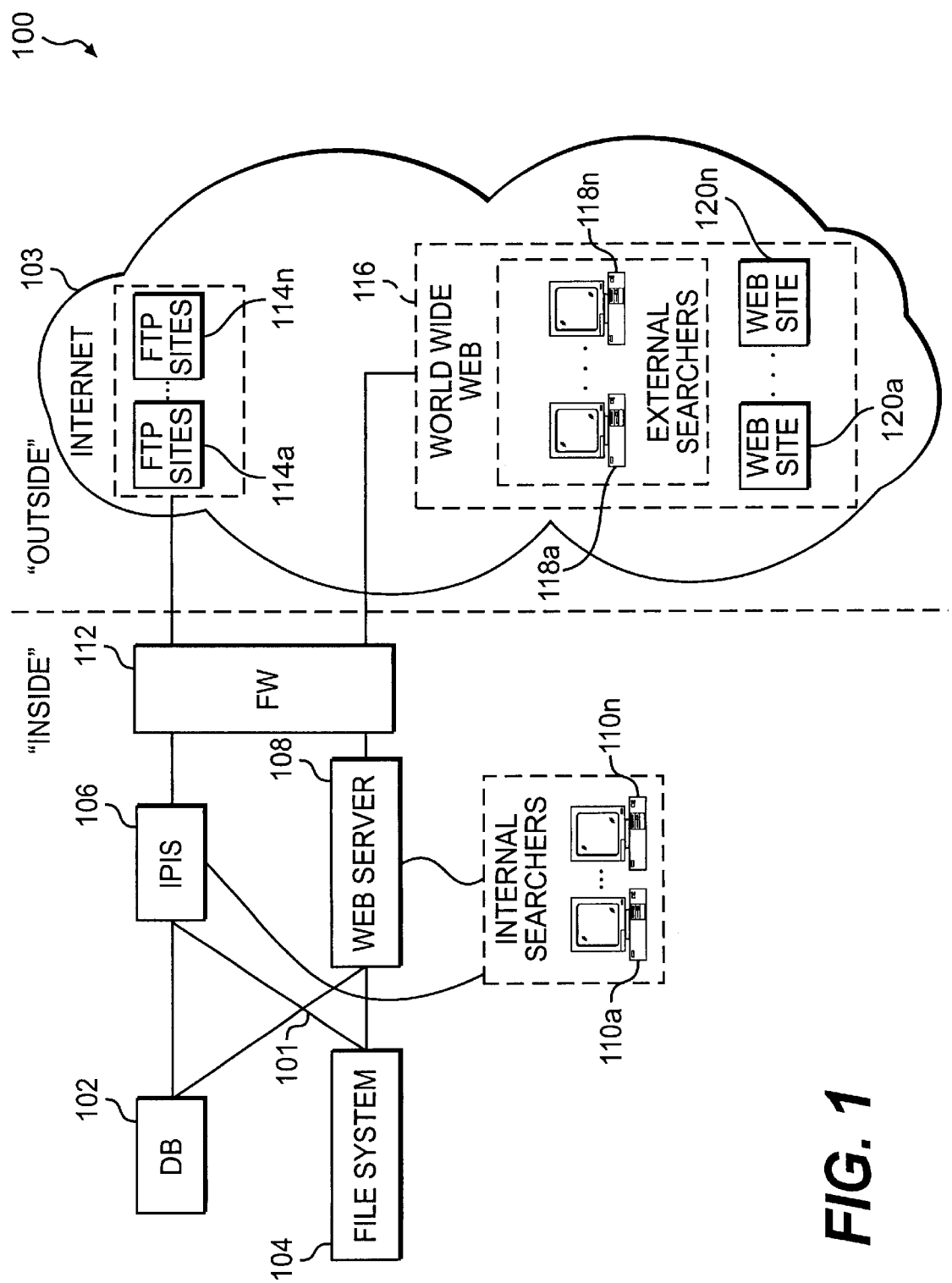
FIG. 1 is a block diagram illustrating the system architecture of an embodiment of the present invention, showing network connectivity among the various components.

FIG. 1 is a block diagram illustrating the physical architecture of a monitoring system 100, according to an embodiment of the present invention, showing network connectivity among the various components. It should be understood that the particular monitoring system 100 in FIG. 1 is shown for illustrative purposes only and does not limit the invention. As will be apparent to one skilled in the relevant art(s), all of components "inside" of the monitoring system 100 are connected and communicate via a local area network (LAN) 101.

The monitoring system 100 includes an intellectual property infringement server 106 (shown as "IPIS" 106) that serves as the "back-end" (i.e., search engine) of the present invention. Connected to the IPIS 106, is a relational database 102 (shown as "DB" 102), a file system 104, and a Web server 108. As is well-known in the relevant art(s), a Web sever is a server process running at a Web site which sends out web pages in response to Hypertext Transfer Protocol (HTTP) requests from remote browsers. The Web server 108 serves as the "front end" of the present invention. That is, the Web server 108 provides the graphical user interface (GUI) to users of the monitoring system 100 in the form of Web pages. Such users may access the Web server 108 at the monitoring organization's site via a plurality of internal search workstations 110 (shown as workstations 110a–n).

A firewall 112 (shown as "FW" 112) serves as the connection and separation between the LAN 101, which includes the plurality of network elements (i.e., elements 102–110) "inside" of the LAN 101, and the global Internet 103 "outside" of the LAN 101. Generally speaking, a firewall—which is well-known in the relevant art(s)—is a dedicated gateway machine with special security precaution software. It is typically used, for example, to service Internet 103 connections and dial-in lines, and protects a cluster of more loosely administered machines hidden behind it from an external invasion.

The global Internet 103, outside of the LAN 101, includes a plurality of various FTP sites 114 (shown as sites 114a–n) and the WWW 116. Within the WWW 116 are a plurality of Web sites 120 (shown as sites 120a–n). The search space for the IPIS 106 includes the WWW 116 and the plurality of FTP sites 114. As mentioned above, it will be apparent to one skilled in the relevant art(s), that the search space (i.e., Internet 103) of the monitoring system 100, although not shown, will also include chat rooms, Usenet newsgroups, FSP sites, etc.

A plurality of external search workstations 118 (shown as workstations 120a–n) are also located within the WWW 116. The external search workstations 118 allow clients of the monitoring organization to remotely perform searches using their own personnel and equipment.

While only one database 102, file system 104, and IPIS 106 computer are shown in FIG. 1, it will be apparent to one skilled in the relevant art(s) that monitoring system 100 may be run in a distributed fashion over a plurality of the above-mentioned network elements connected via LAN 101. For example, both the IPIS 106 "back-end" application and the Web server 108 "front-end" may be distributed over several computers thereby increasing the overall execution speed of the monitoring system 100. More detailed descriptions of the monitoring system 100 components, as well their functionality, are provided below.

III. Software Architecture

Figure 2:
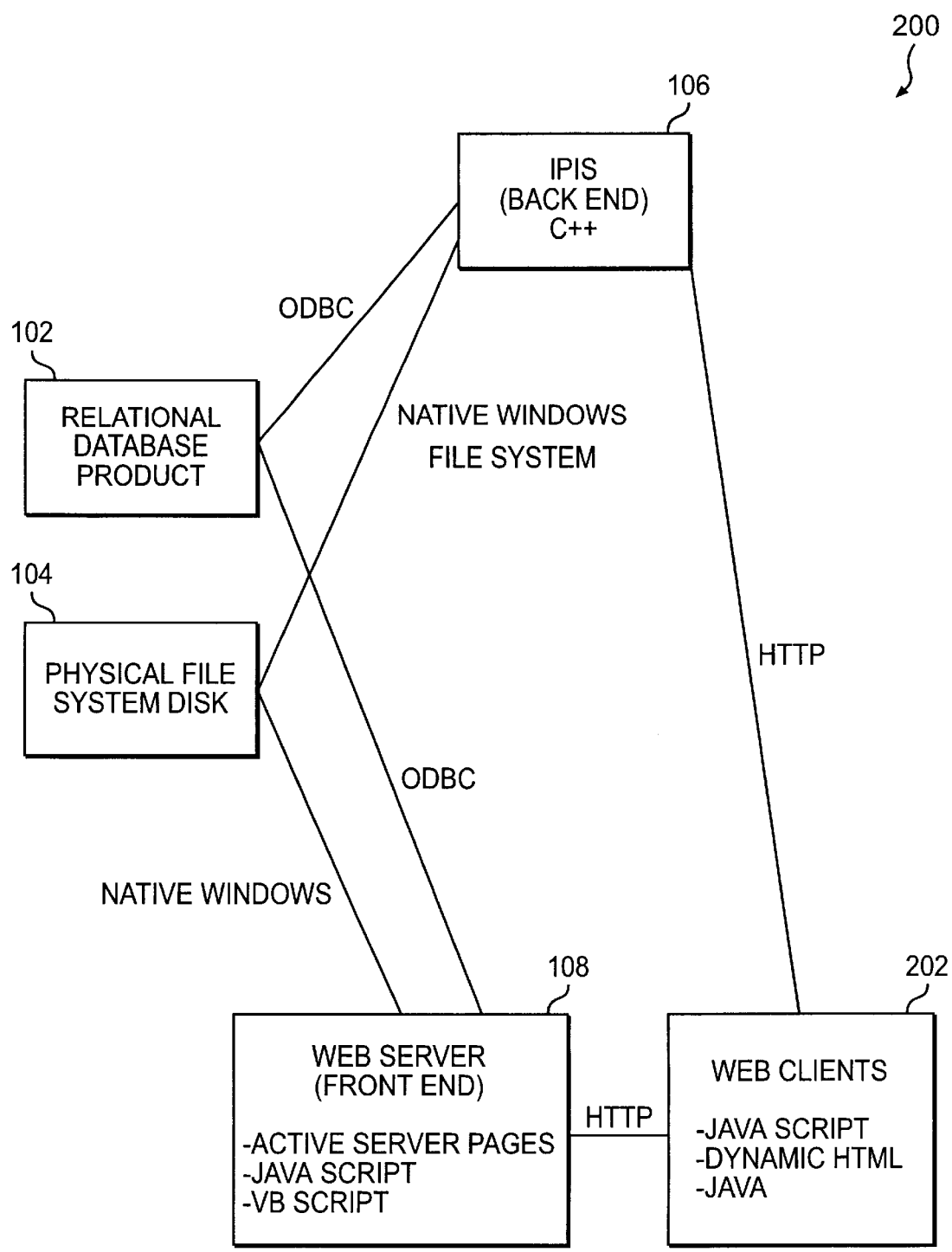
FIG. 2 is a block diagram illustrating the software architecture of an embodiment of the present invention, showing communications among the various components.

Referring to FIG. 2, a block diagram illustrating a software architecture 200 according to an embodiment of monitoring system 100, showing communications among the various components, is shown. The software architecture 200 of monitoring system 100 includes software code that implements the IPIS 106 in a high level programming language such as the C++ programming language. Further, in an embodiment, the IPIS 106 software code is an application running on an IBM™ (or compatible) personal computer (PC) in the Windows NT™ operating system environment.

In a preferred embodiment of the present invention, the database 102 is implemented using a high-end relational database product (e.g., Microsoft™ SQL Server, IBM™ DB2, ORACLE™, INGRES™, etc.). As is well-known in the relevant art(s), relational databases allow the definition of data structures, storage and retrieval operations, and integrity constraints, where data and relations between them are organized in tables.

In a preferred embodiment of the present invention, the IPIS 106 application communicates with the database 102 using the Open Database Connectivity (ODBC) interface. As is well-known in the relevant art(s), ODBC is a standard for accessing different database systems from high level programming language application. It enables these applications to submit statements to ODBC using an ODBC structured query language (SQL) and then translates these to the particular SQL commands the underlying database product employs.

The physical file system 104, in a preferred embodiment of the present invention, is any physical memory device that includes a storage media and a cache (e.g., the hard drive and primary cache, respectively, of the same PC that runs the IPIS 106 application). In an alternative embodiment, the file system 104 may be a memory device external to the PC hosting the IPIS 106 application. In yet another alternative embodiment, the file system 104 may encompass a storage media physically separate from the cache, where the storage media may also be distributed over several elements within LAN 101. Further, in a preferred embodiment of the present invention, the file system 104 communicates with the IPIS 106 application and Web server 108 using the native file commands of the operating system in use (e.g., Windows NT™).

The Web server 108 provides the GUI "front-end" for monitoring system 100. In a preferred embodiment of the present invention, it is implemented using the Active Server Pages (ASP), Visual BASIC (VB) script, and JavaScript™ sever-side scripting environments that allow the creation of dynamic Web pages. The Web server 108 communicates with the plurality of external search workstations 118 and the plurality of internal search workstations 110 (collectively shown as a "Web Clients" 202) using the Hypertext Transfer Protocol (HTTP). The Web clients 202 user interface is a browser implemented using Java, JavaScript™, and Dynamic Hypertext Markup Language (DHTML). In a preferred embodiment of the present invention, as will be described in detail below in Section VIII, the Web clients 202 may also communicate directly with the IPIS 106 application via HTTP.

IV. Overall Monitoring System Operation

A. Inputs and Searching

Figure 3:
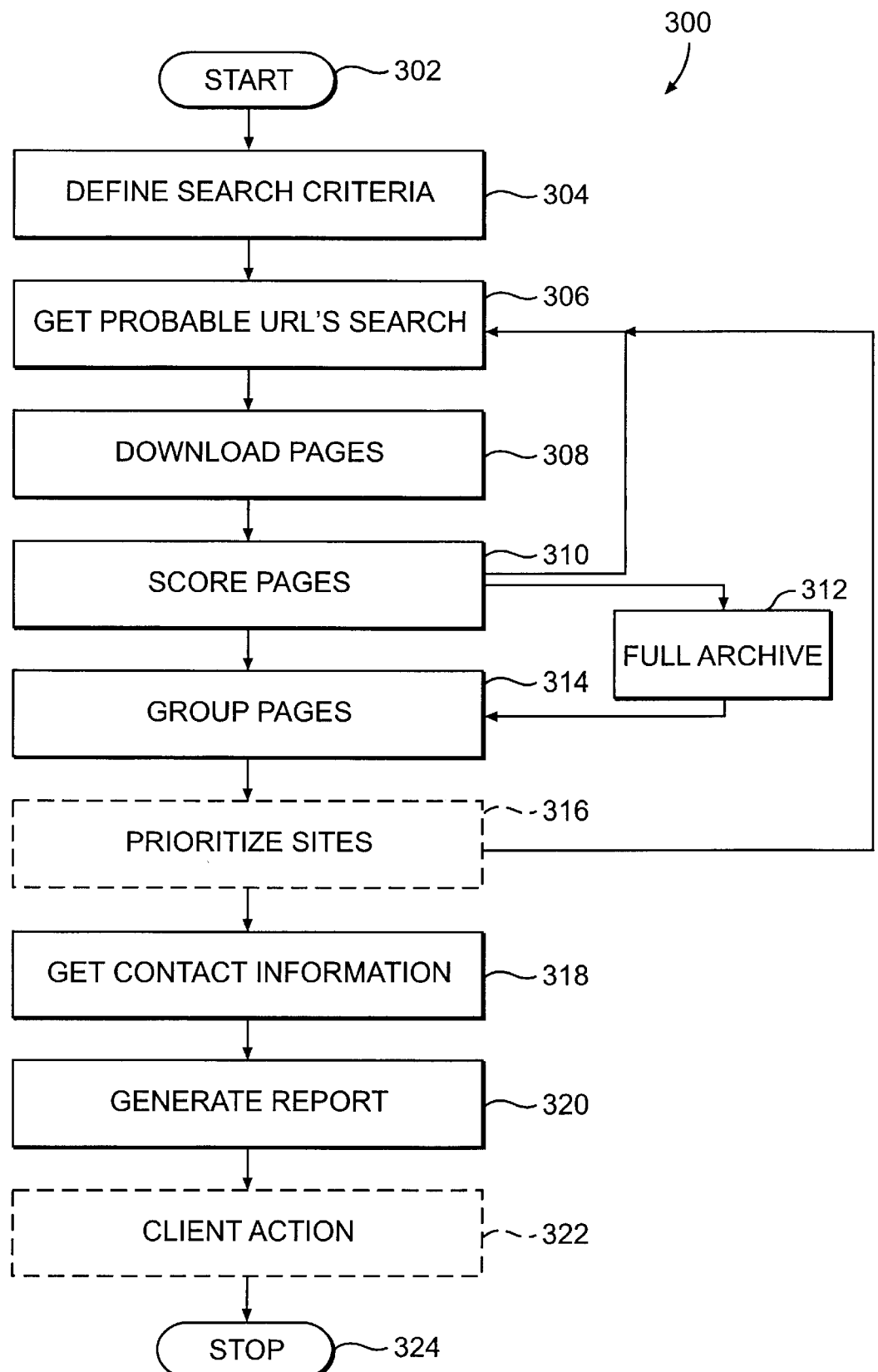
FIG. 3 is a flowchart showing the overall operation of an embodiment of the present invention.

Referring to FIG. 3, a flowchart 300 showing the overall operation of the monitoring system 100, according to an embodiment of the present invention, is shown. Flowchart 300 begins at step 302 with control passing immediately to step 304. In step 304, a user (on one of the Web client 202 workstations), defines a search criteria. The search criteria, as explained in detail below in Section V, are customized according to a particular client's intellectual property infringement or disparagement concerns. In step 306, a search of the Internet 103 is performed. This search returns a list of probable uniform resource locators (URL's). As is well-known in the relevant art(s), a URL is the standard for specifying the location of an object on the Internet 103. The URL standard addressing scheme is specified as "protocol:// hostname" (e.g., "http://www.a_company.com", "ftp:// organization/pub/files" or "news:alt.topic"). An URL beginning with "http" specifies a Web site 120, an URL beginning with "ftp" specifies an FTP site 114, and an URL beginning with "news" specifies a Usenet newsgroup, etc. The probable URL's indicate a first (preliminary) set of locations (i.e., addresses) on the Internet 103, based on the search criteria, where infringements or disparagements may occur. The details of the search in step 306 are described in detail below in Section V.

B. Web Crawling

In step 308, each of the probable URL's is visited and the contents downloaded locally to the cache of the file system 104. The aim of the download step 308 is so that subsequent processing steps of the monitoring system 100 may be performed on "local" copies of the visited URL's. This eliminates the need for re-visiting (and thus, re-establishing a connection to) each of the URL's Web severs, thus increasing the overall performance of the monitoring system 100.

If any of the URL's within the preliminary set contains files, those files may contain potentially infringing materials (e.g., a "*.mp3" music file, or a "*.gif" or "*.jpg" image file). This is in contrast to actual text located on a Web page of a particular Web site 120. The files may be located (1) on a different Web site 120 accessible via a hyperlink on the Web page the monitoring system 100 is currently accessing; (2) on a different Web page of the same Web site 120 the monitoring system 100 is currently accessing; or (3) in a different directory of the FTP site 114 than the monitoring system 100 is currently accessing. In these instances, the monitoring system 100 employs a Web crawling technique in order to locate the files. After the original URL is visited and the link to the file is identified, the monitoring system 100 truncates the link URL at the rightmost slash ("/"), thus generating a new link URL. This process is repeated until a reachable domain is generated. This technique takes advantage of the fact that most designers of Web sites 120 allow "default" documents to be returned by their Web servers in response to such URL (via HTTP) requests. An example of the IPIS 106 Web crawling technique is shown in Table 1 below.

TABLE 1

EXAMPLE OF IPIS 106 WEB CRAWLING TECHNIQUE

Original Web Page URL:
    http://www.links-to-interesting-files-all-over-the-net.com
Interesting Links Found on the Original Web Page Identified by Client's Search Criteria:
    http://www.really-good-music-not-yet-released-.com/future-hit.mp3
    ftp://www.company-trades-secrets.com/july/tradeseceret.doc
Truncated URL's:
    http://www.really-good-music-not-yet-released.com/
    ftp://www.company-trades-secrets.com/july/
    ftp://www.company-trades-secrets.com/

For any Web site 120 where the site's server is not currently responding (i.e., "down" or "off-line"), the IPIS 106 application, before removing the URL corresponding to the site from the preliminary set, implements a "re-try" timer and mechanism.

C. Nice FTP Crawling

When any of the URL's within the preliminary set is an FTP site 114 (or FSP site), the normal steps of visiting and downloading the sites are not practical and thus, not used. Therefore, the present invention contemplates a method for "FTP crawling" in order to accomplish step 308 for such URL's. First, the IPIS 106 application attempts to log into the FTP site 114 specified by the URL. As is well known in the relevant art(s), there are two types of FTP sites 114—password protected sites and anonymous sites. If the site 114 is password protected and the password is not published in a reference linked page, it is passed over and the URL is removed from the preliminary set. If the FTP site 114 has a published password, the IPIS 106 attempts to login using that password. If the FTP site 114 is an anonymous site, the IPIS 106 application attempts to log in. As is well known in the relevant art(s), an anonymous FTP site allows a user to login using a user name such as "ftp" or "anonymous" and then use their electronic mail address as the password.

In any event, if a connection can be established, the IPIS 106 application has access to the directory hierarchy containing the publically accessible files (e.g., a "pub" subdirectory). The IPIS 106 application may then "nicely" crawl the relevant portions of the FTP site 114 by mapping the directory structure and then visiting certain directories based on keywords derived from the defined search criteria (step 304).

The purpose of nice FTP crawling is to capture the relevant contents of the FTP site 114 as it relates to the client without burdening the host's resources by crawling the entire FTP site 114. This is especially important due the large size of a typical FTP site 114 (e.g., a university's site or someone entire PC hard disk drive), and due to the lack of crawl restriction standards like the "robots.txt" file commonly found on Web sites 120.

Suppose the IPIS 106 is searching the for the directory: "ftp://ftp.stuff.com/~user/music/famous_artist" in the context of a music and copyright infringement related search. First, the nice FTP crawling technique involves establishing a single connection to the FTP site 114 (even if multiple content is needed from the site) and then going to the root directory. Second, a counter is then marked zero and a directory listing and snapshot of the current directory is taken. For each directory, if the directory name is "interesting," then the IPIS 106 enters the directory, sets the counter to a positive number (e.g., C=2), then repeats the listing and snapshot step. If the counter is greater than zero or the directory is on the way to the destination directory, then the directory is entered and then the listing and snapshot step is repeated.

To simulate human behavior, it is best if the IPIS 106 performs a depth first search, and introduces slight pauses between directory listings. "Interesting" directory listings are those containing terms related to the search topic. For example, keywords for this search may include "songs," "sound," "album," "artist," "mp3," music_type, famous_artist, etc.) and the destination directory (in the example, it would be "/famous_artist"), and other hard-coded directories that are usually of interest (e.g., "/incoming").

In an alternative embodiment, a user could also specify that uninteresting directories be crawled as well. The purpose of the counter (C) is to set the amount (depth) of sub-directories that the IPIS 106 will crawl in order to find "interesting" files. In a preferred embodiment of the present invention, to ease the burden on FTP site 114 servers, the total number of directories that can be crawled in a single FTP session may be limited.

An example of the nice FTP crawling technique of the IPIS 106 is presented in Table 2 below. Table 2 illustrates a depth-first (from top to bottom) traversal of the directory structure of an FTP site 114.

TABLE 2

EXAMPLE OF IPIS 106 NICE FTP CRAWLING TECHNIQUE ftp://ftp.stuff.com/
    ftp://ftp.stuff.com/~user
        ftp://ftp.stuff.com/~user/homework
        C ftp://ftp.stuff.com/~user/music
            C- ftp://ftp.stuff.com/~user/music/famous_artist1
            . . .
            *C- ftp://ftp.stuff.com/~user/music/famous_artist
            . . .
            C- ftp://ftp.stuff.com/~user/music/famous_artist2
            . . .
            C- ftp://ftp.stuff.com/~user/music/famous_artist3
            . . .
        ftp://ftp.stuff.com/~user/poetry
    ftp://ftp.stuff.com/~user2
    ftp://ftp.stuff.com/~user3
    C ftp://ftp.stuff.com/incoming
    . . .

C = directory judged to be "interesting" in context of the search and counter set to C
C- = counter decremented at this level of the directory tree
* = destination directory
. . . = the IPIS 106 crawls every subdirectory up to the depth of C under the directory The above-described "nice FTP crawling" allows clients to obtain reports with both the URL and contents of any offending FTP site 114.

For any FTP site 114 where the password failed, it is passed over and the URL is removed from the preliminary set. If the site's server is not currently responding (i.e., "down" or "off-line"), too many users were already logged in, or otherwise unavailable for connection, the IPIS 106 application, before removing the URL corresponding to those sites from the preliminary set, implements a "re-try" timer and mechanism.

D. Processing

In step 310, the locally downloaded pages are scored (i.e, ranked). The scoring of the individual pages is based on the inputs specified in the search criteria (step 304). Each page is given a score based on a text search of keywords from the search criteria and statistics accumulated from analyzing the pages. The IPIS 106 application possesses inference code logic that allows anything resident on a page or in the underlying HTML code (i.e., tags) that formats the page to be numerically weighted. The scoring may be based on the separate regions of the page such as the title or information within a tag (e.g., meta-tags, anchor tags, etc.). Also, scoring may be based on such information as the URL of the page itself, dimensions of pictures on the page, the presence of a specific picture file, the number of a certain type of file, length of sound files, watermarks, embedded source information, as well as information about a page provided by another page. During this process, the monitoring system 100 possesses logic to also recognize exact duplicates of client's graphics files (i.e., pictures, logos, etc.), without the need for digital water marking. This additional logic further contributes to the scoring process of step 310.

The scoring of pages may also involve whether any offending URL's contains advertising. This is useful information to clients because those sites are considered commercial and not fan or personal (i.e., non-commercial) sites. Advertisement recognition is accomplished by parsing an image located within an URL and capturing the alt text, click-through URL, click-through resolved URL, and URL of the image. Then, if any of the following three rules are met, the monitoring system 100 identifies the probable presence of an advertisement: (1) the alt text or URL of the advertisement image contains keywords common to those around known advertisements; (2) the click-through URL and the resolved click through URL specify different domains; or (3) the image is an exact match of a known advertisement. During this process, the monitoring system 100 develops a table of advertisement dimensions that are common to each Web site 120 encountered. Thus, a fourth rule may be used to recognize advertisements. That is, if the dimensions of the image fit the tolerances of the dimensions in the table for a Web site 120, the image is probably an advertisement. The data for the table are kept in file system 104 and queried via the relational database 102. Accordingly, the score for each page is adjusted (i.e., increased) if the monitoring system identifies the presence of a probable advertisement.

In step 312, a full archive of the pages is done to the storage media of file system 104. In order to archive each Web page, the "inline" contents of the page must be separated from the non-inline contents. Inline contents include any text, sounds, and images found directly on the Web page and that automatically plays or is displayed when the page is browsed. In contrast, non-inline contents include the links that Web pages contain to other Web sites 120. In order to obtain a "self-sustaining" local copy of the Web page, only the inline contents of each Web page of the preliminary list of URL's is archived to the file system 104. In an alternative embodiment, a client may want included in their final report (step 320 described below) properties or metrics associated with non-inline contents of offending pages. Thus, in such an embodiment, the full archive of step 312 would also include the non-inline contents of each Web page.

As indicated in FIG. 3, the full archive step 312 is optional. That is, a user may desire not to perform a full archive (and thus, not create self-sustaining local copies of the Web pages. Thus, the operation of monitoring system 100 may proceed directly to step 314 after the pages are scored in step 310. In an alternative embodiment, step 314 may perform a partial archive where only the text (HTML) of the pages is archived and not the images, etc.

In step 314, the preliminary set of URL's is grouped into "actual sites." Most people equate Web sites 120 with either domain names or host names. For example, a URL of "http://www.a_company.com" and all the pages under it are typically viewed as one Web site 120. However, as Web designers develop schemes to partition their sites among distinct users, they divide their name space to create sub-sites. Examples are "community sites" which are companies or organizations that provide free homepages, and university servers that house student homepages. In these examples, each user or student with a homepage is an "actual site." Thus, the IPIS 106 application may obtain a preliminary list (from step 306) of probable URL's containing the URL's shown in Table 3 below.

TABLE 3

PRELIMINARY LIST OF URL'S http://www.university_with_many_students.edu/students/b/joe_smith/main.html
http://www.university_with_many_students.edu/students/b/joe_smith/pics/me.jpg
http://www.university_with_many_students.edu/students/c/jane_hacker/main.html
·
·
·

In the example of Table 3, the first two URL's are one actual site, whereas the third is a separate actual site. In a preferred embodiment of the present invention, the IPIS 106 application may recognize which URL's to group into one actual site based both on: (1) patterns such as ~username, /students/?/<?>, /users/?/<?>, /homepages/?/<?>—where "?" is a single character wildcard and "<?>" is an optional single character wildcard; and (2) hard-coded rules for known sites which follow no discernable patterns (e.g., the GeoCities™ community site). The grouping step aids in arriving at a manageable but informative number of URL's that will be included in a client's final report. In a preferred embodiment of the present invention, the above-described grouping technique may be used, in conjunction with the score pages step 310, to present the client with the "best" (i.e., highest scoring) page within an actual site. This removes information clutter from the final report and further aids in arriving at a manageable number of URL's to report.

In step 316, the monitoring system 100 allows the preliminary set of URL's to be prioritized by either the client's personnel (from any of the plurality of workstations 118) or the monitoring organization's personnel (from any of the plurality of workstations 110). This optional human intervention step allows a second (refined and smaller) set of probable URL's to be defined, where likely infringements or disparagements of the client's IP occur. The prioritize step 316 is essentially a re-scoring of the preliminary list of URL's. This refinement allows for more selectivity than what is produced from the search criteria (step 304) alone.

The monitoring system 100 automates as much of the enforcement process as possible in order to minimize the time required by human users and maximize their effectiveness. It is advisable, however, to have humans review and prioritize the set of probable URL's because no presently existing software has the ability to discern the intent of the use of content on a Web page. For example, the monitoring system may identify a page with an image of a famous professional athlete. The monitoring system, however, may not be able to identify whether the image is one where the athlete is pictured, without authorization, in his or her team uniform. Another example includes a page with a probable advertisement identified by the monitoring system 100 which is verified by a human user during step 316.

In a preferred embodiment of the present invention, the IPIS 106 application allows several users to visit, prioritize, and add analysis data to the preliminary set of URL's. As a user on any of the plurality of workstations 110 or workstations 118 visits and prioritizes a Web site 120 corresponding to a URL on the preliminary list, it is marked so no duplication of effort occurs. Further, the monitoring system 100 is also capable of logging, for record keeping purposes, which user has analyzed a page including a time stamp of when the analysis took place.

It should be noted that in alternative embodiments of the present invention, the score pages step 310, full archive step 312, group pages step 314, and prioritize pages step 316 may be performed in an order different than that presented without departing from the spirit and scope of the present invention.

E. Output

In step 318, the monitoring system 100 obtains contact information for each URL in the second refined set. This contact information will later be presented to the client so that the client's legal staff or legal representatives may contact the owners and operators of the "offending" Web sites 120 or FTP sites 114 (i.e., the registrant of the URL). The monitoring system 100, in an automated fashion, obtains the contact information from the Internet. The sources for this information include the Network Information Center (InterNIC). As is well-known in the relevant art(s), InterNIC is a consortium originated by the National Science Foundation to coordinate information services, directory and database services, and registration services within the Internet 103.

In step 320, a final report is generated for the client. The report may be customized for each particular client and typically includes the refined list of URL's, the contact information for each URL, the score for each URL, data provided by the IPIS 106, data provided by users of the monitoring system 100 (i.e., during step 316), as well as charts and graphs containing any metrics the client may request. The relational database 102 is utilized to query the archived data in generating reports, using the relational tables. Reports may relay information, for example, on how downloaded pages have changed over time. A more detailed description of output reports and examples are presented below in Section VII.

In step 322, the client, using the report, may then take (legal) action against the operators of the offending web sites 120 or FTP sites 114 as they see fit. In a preferred embodiment of the present invention, the information contained in the output report may be used by the monitoring system 100 to be directly inputted into a client's workflow. For example, the output report may be used to automatically generate cease and desist letters (customized for each client) to each offending Web site 120 operator. Flowchart 300 (i.e., the operation of monitoring system 100) is thus complete as indicated by step 324.

As shown in FIG. 3, step 306 contains "feedback loops" from step 310 (score pages) and step 316 (prioritize sites). This is because the search engine (i.e., the IPIS application 106) may be run several times to further refine the list of probable URL's. As explained in detail below in Section VI, the search may be performed in one of two modes. The first is a "meta search engine" mode where the search criteria defined in step 304 are searched among a plurality of existing search engines available on the Internet. The second is a "standard search" mode where a list of individual sites is searched. In the "standard search" mode, the list of individual sites may be a list which is a subset of the preliminary lists of sites returned from the meta search mode, a list provided from the client as known (i.e., past) offending sites, or links found within the pages of the URL's located during the meta search mode. The feedback loops further aid in arriving at a manageable number of URL's to be included in a client's final report during step 320.

F. Downloading Non-FTP and Non-HTTP Contents

As mentioned above, the monitoring system 100 may also monitor addresses and search for contents, within the Internet 103, from sites other than Web sites 120 and FTP sites 114.

If, as part of the downloading step 308, an URL that specifies an entire newsgroup is encountered, the IPIS 106 application would connect to a newsgroup server using the network news transfer protocol (NNTP), and download all news postings in the specified newsgroup that have not already been downloaded (determined through message ID numbers). Each news posting is considered an individual piece of content or page. Associated data such as the headers are also kept, as they provide extra data the help discern the content and intent of the page. In an embodiment of the present invention, the IPIS 106 may be put in a "continuous monitor" mode to continually monitor a newsgroup. Thus, the IPIS 106 application would redo this process at an interval shorter than the time a news server times-out and deletes messages that the IPIS 106 application has not yet archived.

If as part of the downloading step 308, an URL that specifies a real-time content site, such as a chat room, or live real audio stream is encountered, the IPIS 106 would watch a stream of data coming from the desired source. As is well-known in the relevant art(s), chat streams typically use the Internet relay chat (IRC) protocol, while real audio streams typically use the PNM protocol. The IPIS 106 application would then save the stream in a form that can later be used for playback (i.e., the "self-sustaining" copy). Because the stream has the potential to play forever, it is desired to divide the stream into chunks that may be re-assembled at a later time. Thus, monitoring continues until either the stream stops, the capture time specified by the user has expired, or if a live filter is being used, the data is shown to be "uninteresting." It is important for IPIS 106 to be controlled by a scheduler in order to capture such real-time streams as they are transient and would otherwise be missed.

V. Graphical User Interface (Front-End)

As mentioned above, in a preferred embodiment of the present invention, the web server 108 front-end provides dynamic HTML pages as the input (GUI) screens to the Web clients 202 (i.e., an internal searcher on any of the plurality of workstations 110 or an external searcher on any of the plurality of workstations 118). The software architecture 200 (as shown in FIG. 2) allows users to view and manipulate the database 102 and cache of the file system 104 without needing to communicate with the IPIS 106.

The step of defining the search criteria (step 304 of FIG. 3) may be customized for each client and their monitoring needs. The monitoring system 100, and more particularly the operation of the IPIS 106 application search engine, is sufficiently flexible in order to assure that standard or customized input screens may be used in step 302.

The customized input HTML GUI screens of the present invention will be dictated by the particular client's needs. For example, different client will prioritize the Web sites 120 they will focus their enforcement efforts towards. The criteria for prioritization may include such factors as whether advertisements appear on the offending Web site 120, the magnitude of infringing activity, etc. Thus, preferably before commencing a search, search criteria are defined that includes a main topic, fields, prioritizations, and de-prioritizations.

Given the vast amount of information on the Web, it is important to define the main topic that is to be searched. While the monitoring system 100 has the ability to search extremely broad topics, the narrower the topic, the more efficient the search. Search topics may include any combination of company names, company subsidiaries, company assets (e.g., a particular artist on a particular record label), etc. In order to maximize the probability of including all relevant information into a search, it is also important to define all possible permutations of a topic. For example, in order to retrieve all of the pages pertaining to a company, the monitoring system 100 may need to search the company name, its acronym, its product or services, etc.

Prior to commencing the actual search step 306, it is preferable to define exactly what fields of information need to be searched. Examples of relevant information fields may include the topics: origin, perception, usage, links, etc. and the categories: personal, education, commercial, foundation, etc. (i.e. categories for origin). Because, many clients who wish to take advantage of the monitoring system 100 capabilities may not understand what topics or categories to search, an experienced monitoring organization user may then define initial topics and categories, based on prior experience and knowledge, and then allow the client to modify them based on the client's knowledge of their business and industry.

Finally, it is important to prioritize and de-prioritize pages based on a client's needs. The monitoring organization's experienced users may work with the user to build a prioritization list, and assign numeric weights to the items on the list. These items are those described above with reference to FIG. 3 (i.e., scoring contents step 310).

As will be apparent to one skilled in the relevant art(s), the GUI of the front-end 108 will allow users of monitoring system 100 to specify all inputs (e.g., search criteria, FTP depth counter, list of specific URL's to search, the total number of sub-directories to crawl, etc.) and mode options (e.g., full, partial, or no archive, etc.) described throughout herein.

VI. Search Engine (Back-End)

A. Multi-Threaded Execution Environment

Figure 4:
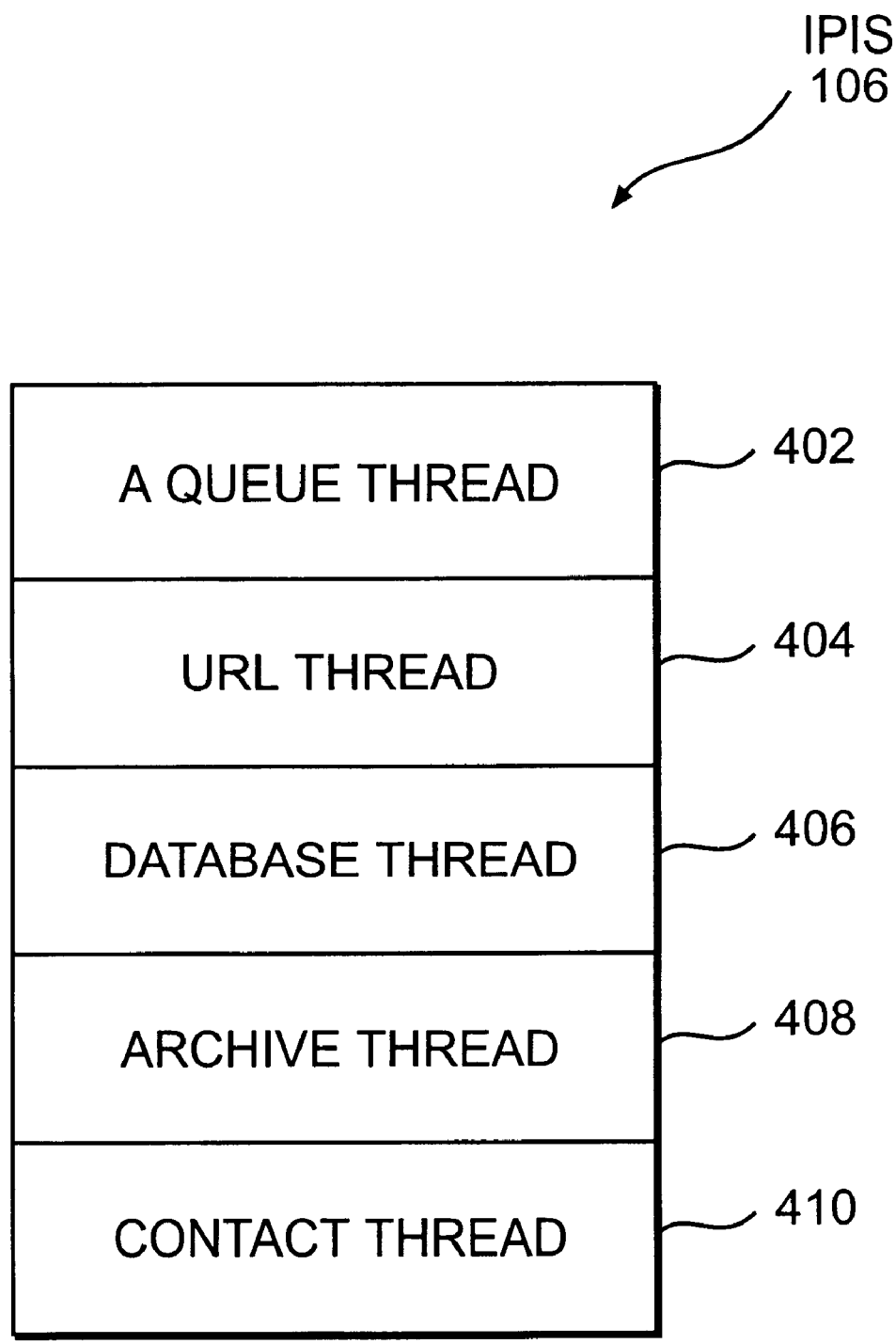
FIG. 4 is a block diagram illustrating the software architecture of an intellectual property infringement server according to an embodiment of the present invention.

As mentioned above, in a preferred embodiment of the present invention, the search engine back-end (i.e., IPIS 106 application) is a C++ application written for the Windows NT™ environment. Referring to FIG. 4, a block diagram illustrating the software architecture of the IPIS 106 application is shown. In a preferred embodiment, the IPIS 106 application is multi-threaded. That is, the program execution environment interleaves instructions from multiple independent execution "threads." The multi-threaded IPIS 106 application thus allows multiple instances of each component (thread) to run simultaneously, on the same computer or in a distributed fashion, thereby increasing the throughput of the monitoring system 100 (i.e., allows monitoring for multiple clients to be done simultaneously). The threads of the IPIS 106 application include a queue thread 402, an URL thread 404, a database thread 406, an archive thread 408, and a contact thread 410.

The queue thread 402 performs step 306 as described above with reference to FIG. 3. That is, the queue thread is responsible for searching and finding potential URL's from the available search engines (meta search mode). While performing the search, the queue thread 402 also implements and performs an optimizing series of searching steps as described below with reference to FIG. 5 (and more particularly, steps 508–522). In a preferred embodiment of the present invention, the IPIS 106 application's queue thread 402 will also search, in standard-search mode, the links found within the URL's pages returned from the meta search.

The URL thread 404 performs step 308 as described above with reference to FIG. 3. That is, the URL thread 404 is responsible for downloading of Web pages corresponding to the URL's found by the queue thread 402. In a preferred embodiment of the present invention, the URL thread 404 is capable of downloading multiple URL's simultaneously to the cache of file system 104. The URL thread 404 also possesses code logic that ensures the data (Web page) is downloaded only if it is not already contained in the cache of file system 104. This logic is implemented by storing associated information about the Web page other than its content. Such information (file size, dimensions, hash value, date archived, file type, width, height, etc.) assures that only modified Web pages, which may have been previously downloaded, are re-downloaded. This also ensures that duplicate and mirror pages are not downloaded and removed from the list of probable URL's. Furthermore, the URL thread 404 possesses intelligence to check return values and error messages when visiting each Web page for downloading. If any URL is unavailable (e.g., non-valid or inactive), before it is passed over and removed from the list of probable URL's, a "re-try" timer and mechanism is utilized.

The database thread 406 performs steps 310 and 314 as described above with reference to FIG. 3. That is, the database thread is responsible for scoring and grouping the Web pages of the URL's previously identified by the queue thread 402 and downloaded by the URL thread 404. The database thread 406 possesses code logic to recognize and extract data from each page in order to later generate the client's final report. Such data includes descriptions, titles, electronic mail addresses, etc. The scoring of each URL done by the database thread 406 is based on the presence, location, and the number of occurrences of certain keywords, links, HTML tags, etc. Furthermore, in addition to scoring the URL's, the "best" (i.e., highest scoring) page from each actual site is marked. The scores aids in and may be modified during the human intervention prioritize step 316, as described above with reference to FIG. 3.

The archive thread 408 performs step 312 as described above with reference to FIG. 3. That is, the archive thread 408 is responsible for fully archiving the URL's downloaded by the URL thread 404 to the storage media of file system 104. The archive thread 408 archives the inline contents of each Web page of each URL's to the file system 104. This assures that monitoring system 100 has a "self-sustaining" local copy of the Web page for later analysis. That is, archived pages will use the archived copy of its links when later browsed within monitoring system 100. The archive thread 408 also possesses code logic to time-stamp the pages and thus, create a "paper trail" that documents the evolution of an offending Web site. This paper trail may also later serve as evidence for a client's legal (enforcement) activities. The archive thread allows the relational database 102 to have access to the archived data when asked to perform queries during the reporting step 320.

The contact thread 410 performs step 318 as described above with reference to FIG. 3. That is, the contact thread is responsible for the automated task of obtaining the InterNIC contact information for each URL in the refined list obtained from the database thread 406 and stored by the archive thread 408.

B. Standard Search Engine Mode

As mentioned above, the search (get probable URL's) step 306 contains "feedback loops" from steps 310 (score pages) and 316 (prioritize sites). The search may be performed in one of two modes to aid in arriving at a manageable number of URL's to be included in a client's final report. The two modes are "meta search engine" mode and "standard search" mode.

As indicated in FIG. 3, step 306 contains a "feedback loop" from steps 310 (score pages) and 316 (prioritize sites). Once a "meta search engine" mode search has been performed as described in further detail below with reference to FIG. 5, a "standard search" where a list of individual sites is searched may be performed. Alternatively, the "standard search" may search a list provided from a client as known offending sites. Each site is visited and made available to the archive thread 408 (to perform step 312 as indicated in FIG. 3).

C. Meta Search Engine Mode

Figure 5:
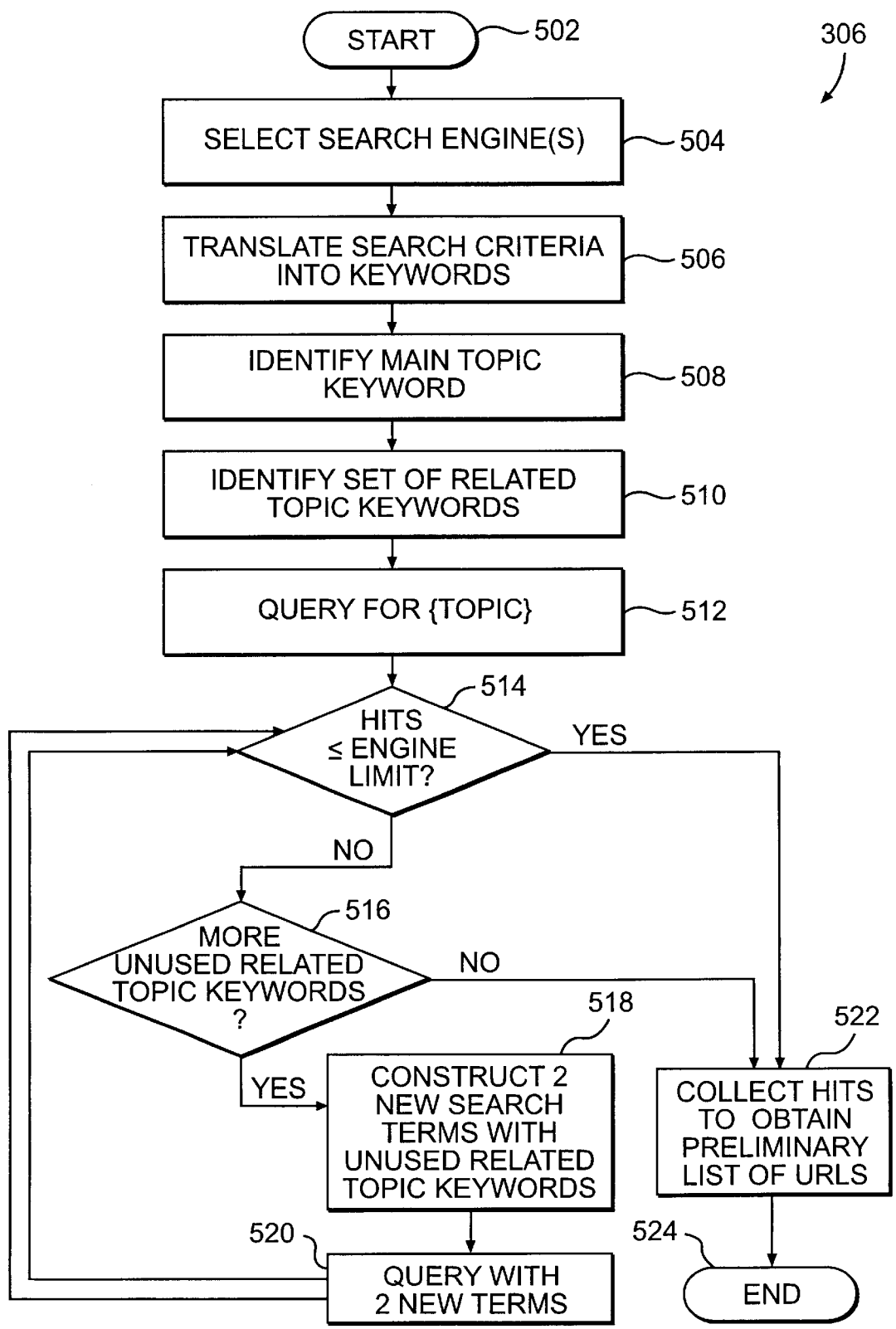
FIG. 5 is a flowchart showing the operation of a meta search engine, according to an embodiment of the present invention.

Referring to FIG. 5, a flowchart showing the operation of the IPIS 106 application's meta search engine mode (during step 306), according to an embodiment of the present invention, is shown. Flowchart 306 begins at step 502 with control passing immediately to step 504. In step 504, the IPIS 106 receives from the front-end a list of selected search engines to be searched. As is well-known in the relevant art(s), many commercial and non-commercial search engines are available on the Internet that allow remote access to perform keyword searches for information (e.g., full text, document titles, URL's, headers, etc.). Examples of commonly available search engines include HotBot™, Excite™, and InfoSeek™.

In step 506, the defined search criteria (step 304 of FIG. 3) received by the front end are translated into keywords in order to perform an appropriate search of the selected search engines. Next, the IPIS 106 application is ready to perform keyword searches using the selected search engines. However, the IPIS 106 application must first sub-divide a large query into a set of sub-queries sufficiently small for existing search engines to perform, based on the maximum number of URL matches (or "hits") which they return. Thus, in order to perform a full search and ensure the preliminary list of probable URL's that is sufficiently large, an optimizing series of searching steps (508–520) is performed by implementing a boolean search tree.

In step 508, a main topic keyword is identified from the translated search criteria derived in step 506. In step 510, a set of related topic keywords is identified from the translated search criteria derived in step 506. In step 512, the search engine is queried for the main topic keyword. In step 514, it is determined whether the number of hits is below the maximum limit. If the number of hits is below the maximum limit, the list of returned URL's (hits) is collected in step 522. Flowchart 306 is thus complete as indicated by step 524.

If step 514 determines that the number of hits is not below the maximum limit, it is determined in step 516 whether there are any unused (i.e., not queried) keywords from the set of related topic keywords. If there are any unused set of related topic keywords, step 518 constructs 2 new search queries: (1) {topic} AND {next unused related keyword}; and (2) {topic} AND NOT {next unused related keyword}. In step 520 the two new query terms are searched. This process is recursively repeated until all number of hits are below the limit or no more unused related keyword remain. All the lists of returned URL's (hits) from each query in step 520 are then collected in step 524. Flowchart 306 is thus complete as indicated by step 524.

An example of the above-described optimizing series of searching steps 508–522 (i.e., a boolean search tree) is shown in Table 4 below. As will be apparent to one skilled in the relevant art(s), the searching steps 508–522 would be repeated for every search engine selected in step 504.

TABLE 4

EXAMPLE OF OPTIMIZING SERIES OF SEARCHING STEPS

Search Engine Limit = 1000 hits
Topic = car
Related Words = {sports, red, new, Brand ™, truck}
Queries =
    Car {5000 hits}
        Car AND sports {3500 hits}
            (Car AND sports) AND new {800 hits}*
            (Car AND sports) AND NOT new{2700 hits}
                ((Car AND sports) AND NOT new) AND Brand {900 hits}*
                ((Car AND sports) AND NOT new) AND NOT Brand) {1600 hits}
                (((Car AND sports) AND NOT new) AND NOT Brand) {700 hits}*
                (((Car AND sports) AND NOT new) AND NOT Brand) {900 hits}*
        Car AND NOT sports {1500 hits}
            (Car AND NOT sports) AND new {900 hits}*
            (Car AND NOT sports) AND NOT new {600 hits}*

*The results of these queries may be downloaded and combined into an (unordered) list of probable URL's.

VII. Output Reports

Similar to the search input screens of and the step of defining the search criteria (step 302 of FIG. 3), the output reports of the present invention may be also be customized for each client and their monitoring needs. The monitoring system 100, and more particularly the operation of the IPIS 106 application threads, is sufficiently flexible in order to assure that customized reports may be generated and delivered in electronic (soft copy) or paper (hard copy) form.

Referring to FIG. 6, an standard output report page 600, according to an embodiment of the present invention, is shown. Output report page 600 is a table that includes a row 602 for each URL (shown as rows 602a–n) that monitoring system 100 returned as having contents matching the search criteria entered by any of the Web client 202 users. Each row would contain the information specified by the column headers. For example, a column 604 contains the URL of the offending Web site 120 or FTP site 114. A column 606, 608, and 610 would contain the title of the URL, a description, and any electronic mail addresses, respectively, as extracted from the page by the database thread 406 during the operation of the monitoring system 100. A column 612 would contain the contact information for the URL registrant (i.e., street address, telephone number, fax number, etc.) as gathered by the contact thread 410. Thus, page 600 is a standard report page that may be generated for every client of the monitoring organization regardless of the search criteria or the client's form of intellectual property or disparagement concerns.

Figure 7:
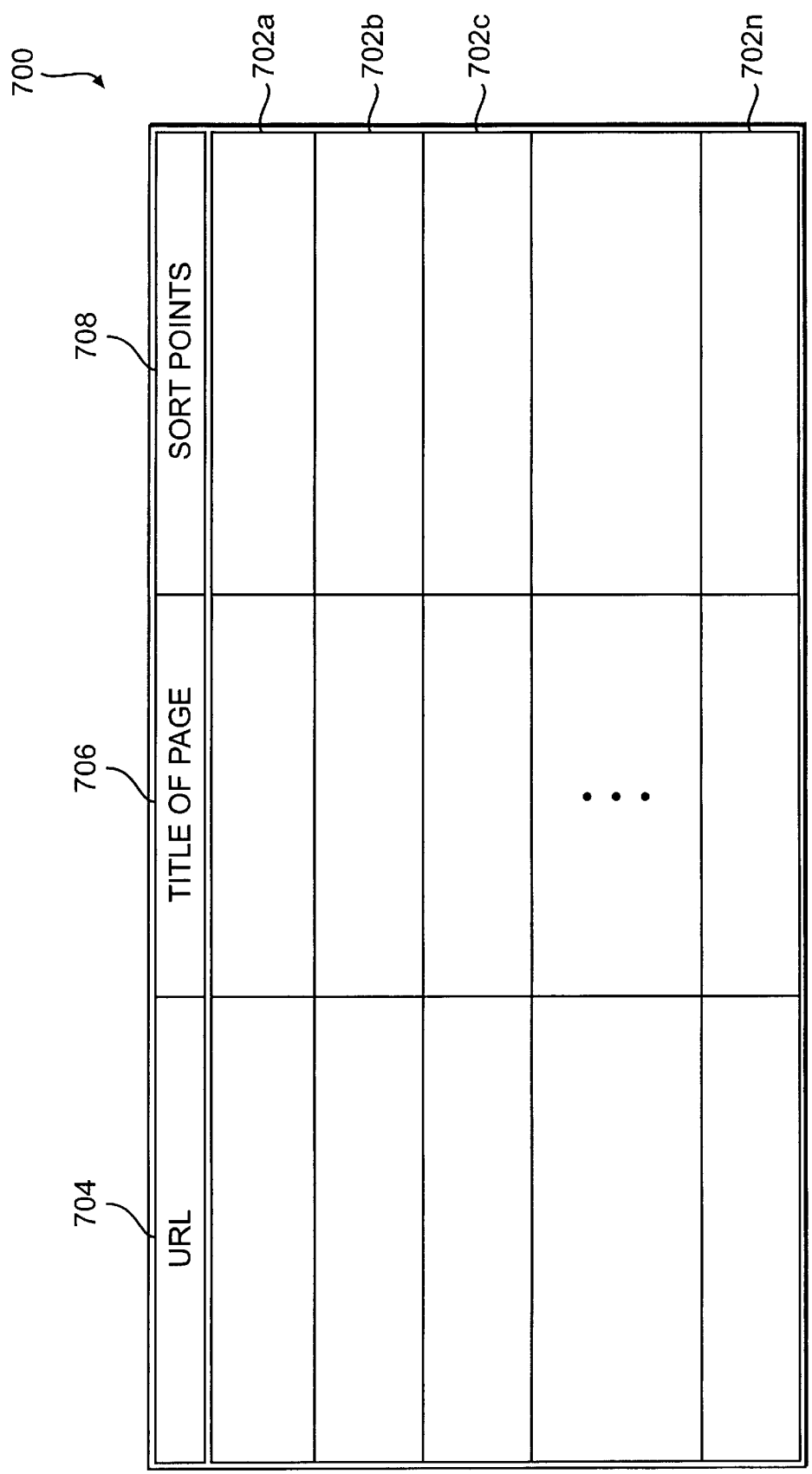

FIG. 7 shows a standard output report page 700 according to an embodiment of the present invention. Output report page 700 is a table that includes a row 702 for each URL (shown as rows 702a–n) that monitoring system 100 returned as having contents matching the search criteria entered by any of the Web client 202 users. For example, a column 704 contains the URL of the offending Web site 120 or FTP site 114. A column 706 contains the title of the URL as extracted from the page by the database thread 406 during the operation of the monitoring system 100. A column 708 contains the URL's score according to the search criteria and as assigned by the score pages step 314 (of FIG. 3). Thus, page 700 is also a standard report page that may be generated for every client of the monitoring organization regardless of the search criteria or the client's form of intellectual property or disparagement concerns.

FIG. 8 shows a custom output report page 800 according to an embodiment of the present invention. Output report page 800 is a table that includes a row 802 (shown as rows 802a–n) for each URL (shown as rows 802a–n) that monitoring system 100 returned as having contents matching the search criteria entered by any of the Web client 202 users. For example, a column 804 would contain the type of activity engaged in by the operator of the offending URL. A column 806 would contain the origin of the URL (i.e., whether the page is a commercial page or a personal page).

Further, a column 808 would contain the storefront that the URL is adverting for its product. In other words, whether the Web site 120 is engaged in electronic commerce ("virtual") or simply advertising an actual "physical" store. As mentioned above, this is the type of analysis data which may be collected and stored by a user during step 316, which allows human intelligence to be utilized to collect and interpret data that is not automatically captured by the IPIS 106 application.

A column 810 indicates the form of payment the operator of the Web site 120 accepts (e.g, credit card, cash, check, etc.). A column 812 indicates the source(s) of revenue for the operator of the Web site 120 (e.g., advertisements, subscriptions, contests, etc.). A column 814 indicates the type (e.g., personal homepage, commercial, etc.) of Web site 120 referenced by the URL. Finally, a column 816 indicates what form(s) of the client's content (e.g., video, logo, text, etc.) may be found on the offending Web site 120. Thus, page 800 is a custom, supplemental report page (i.e., a supplement to page 600) that may be generated for clients of the monitoring organization whose intellectual property and search terms involve a printed publication (e.g., magazine). As such, as will be apparent of one skilled in the relevant art(s), the column headings may also be changed to reflect the requested metrics of a particular client of the monitoring organization.

Figure 9:
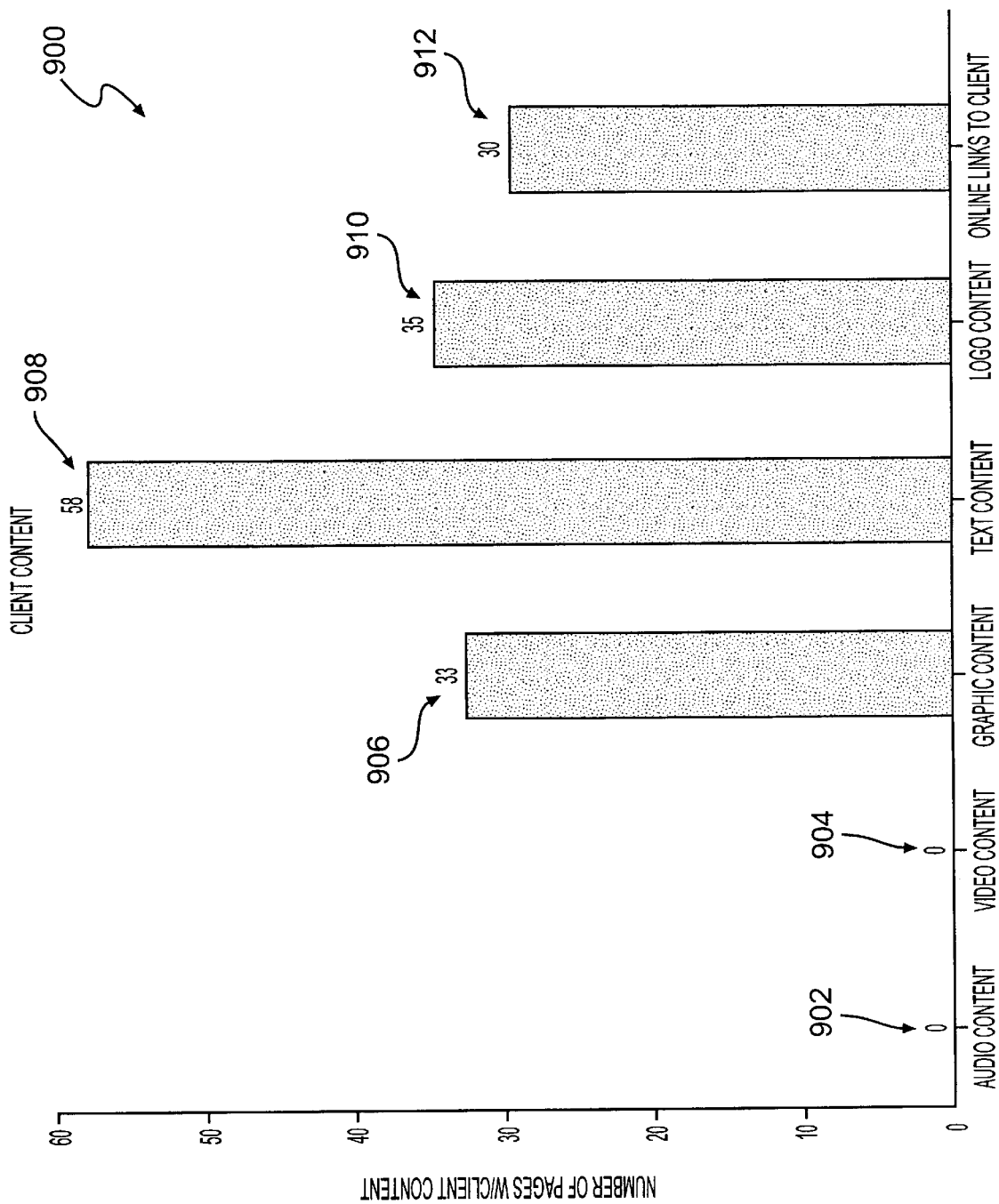

FIG. 9 shows an output report page 900 according to an embodiment of the present invention. Output report page 900 is a bar chart that indicates what form(s) of the client's content have been found on offending Web sites 120 and the frequency of such findings for a particular search. Columns 902–910 display the frequency of audio, video, graphic, text, and logo, respectively, the monitoring system 100 has found among the offending Web sites 120. These metrics are available for reporting because the database thread 406 (during the page scoring step 310) extracts the necessary information from the downloaded pages. A column 912 indicates, if applicable, the number of URL's found that have links to a client's own Web site 120. Thus, page 900 is a supplemental report page that may be generated for clients of the monitoring organization.

Figure 10:
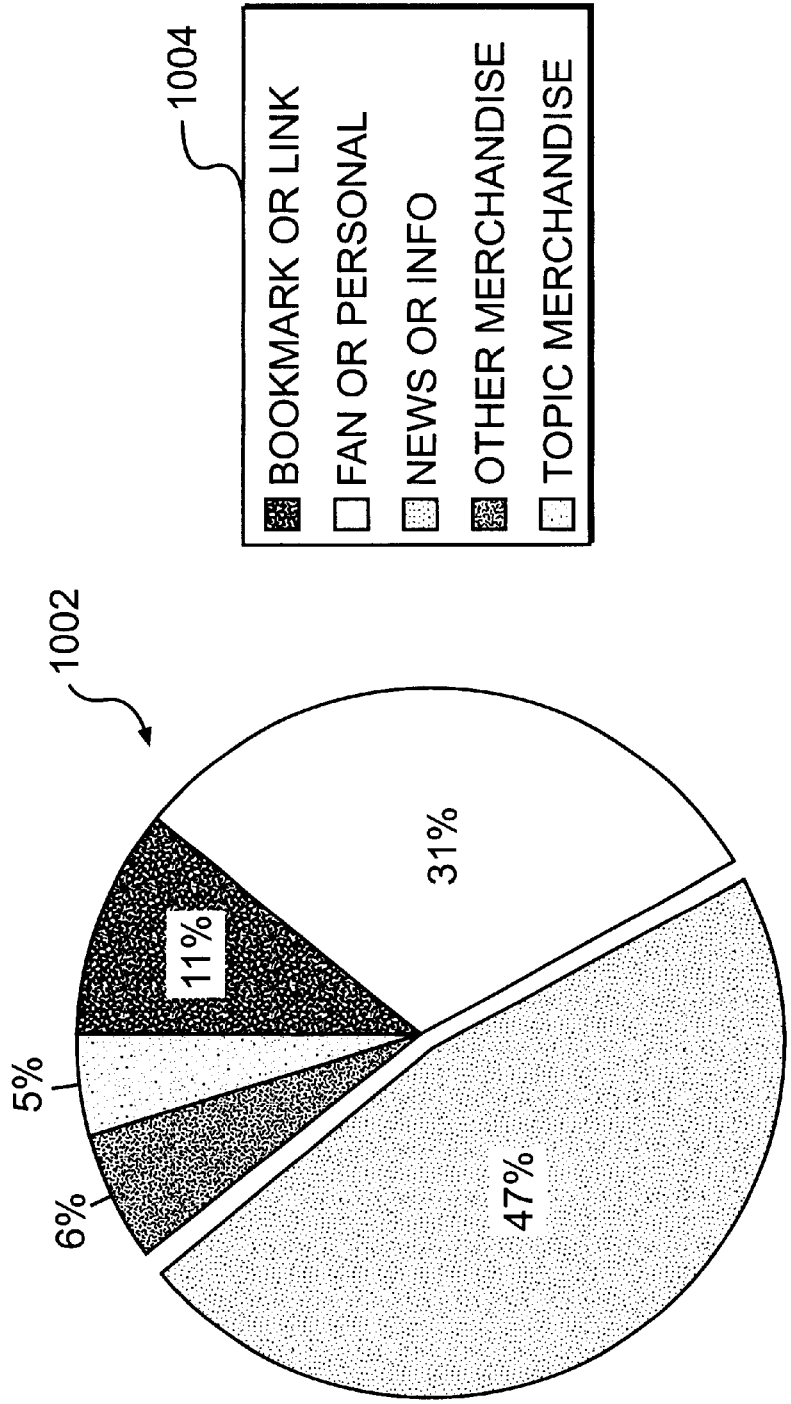

FIG. 10 shows an output report page 1000 according to an embodiment of the present invention. Output report page 1000 is a chart that indicates what types of offending Web sites 120 (i.e., the purpose of the sites) and the frequency of such types for a particular search. A chart 1002 present the metrics in a pie chart form displaying the frequencies, while a legend 1004 helps explain the types of offending URL's. These metrics are made available by the database thread (during the page scoring step 310) extracting information from the downloaded pages. Thus, page 900 is a also supplemental report page that may be generated for clients of the monitoring organization.

It should be noted that the particular metrics appearing in output pages of the monitoring system 100, result from the client's monitoring and enforcement needs. Thus, it will be apparent to one skilled in the relevant art(s) that the search criteria defined in step 304 dictates the information that the database thread 406 will extract from the pages of the offending URL's during operation of the monitoring system 100. The search criteria also dictate the types of queries the IPIS 106 will make of the relational database 102 during the generate report step 320.

For example, a client of the monitoring organization may be interested to know which of the offending URL's contained advertising. This is useful information because those sites are thus commercial sites and not fan or personal homepages. Thus, in a preferred embodiment of the present invention, the database thread 406 will provide the advertisement recognition capability described above with reference to FIG. 3.

VIII. Front-End and Back-End Severability

In a preferred embodiment of the present invention, the front-end and back-end of the monitoring system 100 are constructed so that they may operate independently of each other. The practical implications of this is that the front-end is able to provide uninterrupted ("24×7") service to view archived data (i.e., contents of offending sites), while the back-end is either unavailable or focusing on a different subset of clients. Because the front-end is the entire GUI to use the monitoring system 100 (and thus, controls the activities of the back-end), it possesses code logic to not only communicate with the IPIS 106 application via HTTP, but also utilize a message queuing system to leave "messages" when the back-end is unavailable due to failure, maintenance, upgrades, etc. This may be implemented by using the database 102 to log commands, which the IPIS 106 may "pick-up" when it returns online. The same queuing system is utilized to queue commands from the plurality of users on internal workstations 110 and external workstations 118. Furthermore, the DHTML pages of the Web server 108 allow certain client functions (e.g., user validation) to occur entirely on the front-end, thus improving the performance of the IPIS 106 back-end.

In an embodiment of the present invention, internal users of the monitoring system 100 (for security reasons) have access to the IPIS 106 via the HTTP communication link between the Web clients 202 and the IPIS 106, as shown in FIG. 2. This is a faster communications link to the IPIS 106 because the Web server 108 and database 102 are bypassed. Consequently, messages sent to the IPIS 106 back-end via this path are not queued, but executed directly without waiting. This path may be used to send commands needing immediate effect (e.g., turn on/off or modifying search variables in real-time).

IX. Environment

The present invention (i.e., IPIS 106, monitoring system 100 or any part thereof) may be implemented using hardware, software or a combination thereof and may be implemented in a computer system or other processing system. In fact, in one embodiment, the invention is directed toward one or more computer systems capable of carrying out the functionality described herein. An example of a computer system 1100 is shown in FIG. 11. The computer system 1100 includes one or more processors, such as processor 1104. The processor 1104 is connected to a communication bus 1106. Various software embodiments are described in terms of this exemplary computer system. After reading this description, it will become apparent to a person skilled in the relevant art how to implement the invention using other computer systems and/or computer architectures.

Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, a phone line, a cellular phone link, an RF link and other communications channels.

In this document, the terms "computer program medium" and "computer usable medium" are used to generally refer to media such as removable storage drive 1114, a hard disk installed in hard disk drive 1112, and signals 1128. These computer program products are means for providing software to computer system 1100. The invention is directed to such computer program products.

Computer programs (also called computer control logic) are stored in main memory 1108 and/or secondary memory 1110. Computer programs may also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112 or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

X. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the present invention should not be limited by any of the above-described exemplary embodiments, but should be defined only in accordance with the following claims and their equivalents.

What is claimed is:

1. A method for performing online monitoring of a computer network, comprising the steps of:
  (1) receiving search criteria from a user, wherein said search criteria reflects the intellectual property infringement or disparagement concerns of said user;
  (2) searching the computer network for addresses that specify sites which contain contents matching said search criteria, said searching step comprising the steps of:
    (a) selecting an existing search engine that is available on the computer network, wherein said search engine is configured to return only a subset of n hits of a total set of N hits actually found by said search engine;
    (b) translating said search criteria into a set of related keywords and a main topic keyword;
    (c) querying said search engine for said main topic keyword; and
    (d) when step (c) returns a number of hits greater than n, constructing two new queries in the forms of:
      (i) {said main topic keyword} AND {an unused related keyword from said set of related keywords}; and
      (ii) {said main topic keyword} AND NOT {said unused related keyword};
  (3) obtaining a list of offending addresses that contain contents matching said search criteria; and
  (4) downloading said contents from each offending address within said list;
  whereby said downloaded contents represent unrealized hits said search engine would not otherwise return and may be utilized by said user to plan intellectual property infringement or disparagement enforcement activities.

2. The method of claim 1, wherein the computer network is the global Internet.

3. The method of claim 2, further comprising the steps of:

performing steps (b)–(d) on a plurality of search engines;

concatenating the hits from each of said search engines into said list of offending addresses; and removing duplicates from said list of offending addresses.

4. The method of claim 2, wherein step (4) comprises the steps of:
   (a) Nice File Transfer Protocol (FTP) crawling when one of said list of offending addresses is a FTP site;
   (b) Web crawling when one of said list of offending addresses is a Web site; and
   (c) copying the contents of said one of said list of offending addresses to said local file system.

5. The method of claim 1, wherein the computer network is an intranet.

6. The method of claim 1, wherein the computer network is an extranet.

7. The method of claim 1, further comprising the steps of:
   (5) archiving contents from each offending address within said list to a local file system;
   (6) obtaining a score for each offending address within said list; and
   (7) generating a report listing said list of offending addresses and said score for each offending address within said list.

8. The method of claim 7, further comprising the steps of:
   (8) grouping said contents from each of said list of offending addresses to form a list of actual sites; and
   (9) obtaining contact information for each of said list of actual sites.

9. The method of claim 7, further comprising the steps of:
   (8) grouping said contents from each of said list of offending addresses to form a list of actual sites;
   (9) obtaining a score for each page of each actual site within said list; and
   (10) generating a report listing the highest scoring page of each actual site within said list.

10. The method of claim 7, wherein step (5) comprises the steps of:
    (a) seperating inline and non-inline contents of each page of said contents for said each offending address within said list; and
    (b) copying said inline contents to said local file system.

11. A computer program product comprising a computer usable medium having computer readable program code means embodied in said medium for causing an application program to execute on a computer that performs online monitoring of a computer network, said computer readable program code means comprising:

a first computer readable program code means for causing the computer to receive search criteria from a user, wherein said search criteria reflects the intellectual property infringement or disparagement concerns of said user;

a second computer readable program code means for causing the computer to search the computer network for addresses that specify sites which contain contents matching said search criteria, wherein said second computer readable program code means comprises:

a third computer readable program code means for causing the computer to select an existing search engine that is available on the computer network, wherein said search engine is configured to return only a subset of n hits of a total set of N hits actually found by said search engine;

a fourth computer readable program code means for causing the computer to translate said search criteria into a set of related keywords and a main topic keyword;

a fifth computer readable program code means for causing the computer to query said search engine for said main topic keyword; and a sixth computer readable program code means for causing the computer to construct two new queries when said fifth computer readable program code means returns a number of hits greater than n in the forms of:
   (i) {said main topic keyword} AND {an unused related keyword from said set of related keywords}; and
   (ii) {said main topic keyword} AND NOT {said unused related keyword};

a seventh computer readable program code means for causing the computer to obtain a list of offending addresses that contain contents matching said search criteria; and an eighth computer readable program code means for causing the computer to download said contents from each offending address within said list;

whereby said downloaded contents represent unrealized hits said search engine would not otherwise return and may be utilized by said user to plan intellectual property infringement or disparagement enforcement activities.

12. The computer program product of claim 11, wherein the computer network is the global Internet.

13. The computer program product of claim 12, further comprising:

a ninth computer readable program code means for causing the computer to group said contents from each of said list of offending addresses to form a list of actual sites; and a tenth computer readable program code means for causing the computer to obtain contact information for each of said list of actual sites.

14. The computer program product of claim 12, further comprising:

a ninth computer readable program code means for causing the computer to group said contents from each of said list of offending addresses to form a list of actual sites;

a tenth computer readable program code means for causing the computer to obtain a score for each page of each actual site within said list; and an eleventh computer readable program code means for causing the computer to generate a report listing the highest scoring page of each actual site within said list.

15. The computer program product of claim 12, further comprising:

a ninth computer readable program code means for causing the computer to perform the functions of computer readable program code means four-six on a plurality of search engines;

a tenth computer readable program code means for causing the computer to concatenate the hits from each of said search engines into said list of offending addresses; and an eleventh computer readable program code means for causing the computer to remove duplicates from said list of offending addresses.

16. The computer program product of claim 12, wherein said eighth computer readable program code means comprises:
   a ninth computer readable program code means for causing the computer to Nice File Transfer Protocol (FTP) crawling when one of said list of offending addresses is a FTP site;
   a tenth computer readable program code means for causing the computer to Web crawling when one of said list of offending addresses is a Web site; and
   an eleventh computer readable program code means for causing the computer to copy the contents of said one of said list of offending addresses to a local file system.

17. The computer program product of claim 11, further comprising:
   a ninth computer readable program code means for causing the computer to archive said contents from each offending address within said list to a local file system;
   a tenth computer readable program code means for causing the computer to obtain a score for each offending address within said list; and
   an eleventh computer readable program code means for causing the computer to generate a report listing said list of offending of offending addresses and said score for each offending address within said list.

18. The computer program product of claim 17, wherein said ninth computer readable program code means comprises:
   a tenth computer readable program code means for causing the computer to separate inline and non-inline contents of each page of said contents for each offending address within said list; and
   an eleventh computer readable program code means for causing the computer to copy said inline contents to said local file system.

* * * * *